US008623223B2

(12) United States Patent
Dobisz et al.

(10) Patent No.: US 8,623,223 B2
(45) Date of Patent: *Jan. 7, 2014

(54) METHOD USING BLOCK COPOLYMERS FOR MAKING A MASTER DISK WITH RADIAL BINARY ENCODED NONDATA MARKS FOR NANOIMPRINTING PATTERNED MAGNETIC RECORDING DISKS

(75) Inventors: Elizabeth Ann Dobisz, San Jose, CA (US); Jeffrey S. Lille, Sunnyvale, CA (US); Guoliang Liu, Madison, WI (US); Ricardo Ruiz, San Bruno, CA (US); Gabriel Zeltzer, Mountain View, CA (US)

(73) Assignee: HGST Netherlands B.V., Amsterdam (NL)

( * ) Notice: Subject to any disclaimer, the term of this patent is extended or adjusted under 35 U.S.C. 154(b) by 174 days.

This patent is subject to a terminal disclaimer.

(21) Appl. No.: 13/299,664

(22) Filed: Nov. 18, 2011

(65) Prior Publication Data
US 2013/0126473 A1 May 23, 2013

(51) Int. Cl.
*B44C 1/22* (2006.01)
(52) U.S. Cl.
USPC .............. 216/11; 216/22; 216/41; 216/49; 216/67; 216/83
(58) Field of Classification Search
None
See application file for complete search history.

(56) References Cited

U.S. PATENT DOCUMENTS

| 7,643,234 | B2 | 1/2010 | Albrecht et al. | |
| 7,920,354 | B2 | 4/2011 | Pokharel et al. | |
| 7,976,715 | B2 * | 7/2011 | Dobisz et al. | 216/11 |
| 8,059,350 | B2 * | 11/2011 | Albrecht et al. | 360/48 |
| 8,119,017 | B2 * | 2/2012 | Albrecht et al. | 216/22 |
| 8,257,598 | B2 * | 9/2012 | Albrecht et al. | 216/22 |
| 2010/0159214 | A1 | 6/2010 | Hasegawa et al. | |
| 2010/0279062 | A1 * | 11/2010 | Millward et al. | 428/119 |
| 2010/0316849 | A1 | 12/2010 | Millward et al. | |
| 2011/0096436 | A1 * | 4/2011 | Albrecht et al. | 360/135 |
| 2012/0111827 | A1 * | 5/2012 | Albrecht et al. | 216/22 |
| 2013/0105437 | A1 * | 5/2013 | Albrecht et al. | 216/22 |

OTHER PUBLICATIONS

Detcheverry et al., "Interpolation in the Directed Assembly or Block Copolymers on Nanopatterned Substrates: Simulation and Experiments", Macromolecules 2010, 43, 3446-3454, published on Web Mar. 5, 2010.

(Continued)

*Primary Examiner* — Anita Alanko
(74) *Attorney, Agent, or Firm* — Thomas R. Berthold

(57) ABSTRACT

A method using directed self-assembly of BCPs enables the making of a master disk for nanoimprinting magnetic recording disks that have patterned data islands and patterned binary encoded nondata marks. The method uses guided self-assembly of a BCP to form patterns of sets of radial lines and circumferential gaps of one of the BCP components, which can be used as an etch mask to make the master disk. The sets of radial lines and circumferential gaps can be patterned so as to encode binary numbers. The pattern is replicated as binary encoded nondata marks into the nanoimprinted disks, with the marks functioning as binary numbers for data sector numbers and/or servo sector numbers. If the disks also use a chevron servo pattern, the binary numbers can function to identify groups of tracks associated with the chevron servo pattern.

21 Claims, 12 Drawing Sheets

(56) References Cited

OTHER PUBLICATIONS

Stoykovich et al., "Directed Self-Assembly of Block Copolymers for Nanolithography: Fabrication of Isolated Features and Essential Integrated Circuit Geometries", Published Online Oct. 6, 2007, www.acsnano.org.

Park et al., "Block copolymer multiple patterning integrated with conventional ArF lithography", Soft Matter, 2010,6,120-125; First published as an Advance Article on the web Sep. 17, 2009 DOI: IO.1039/b913853f.

Kapaklis, et al., "Nanolithographic Templates Using Diblock Copolymer Films on Chemically Heterogeneous Substrates", J. Nanoscience and Nanotechnology 2010, vol. 10. No. 9, 6056-6061.

Yang et al., "Complex self-assembled patterns using sparse commensurate templates with locally varying motifs", Nature Nanotechnology, vol. 5, Apr. 2010, 256-258.

\* cited by examiner

METHOD USING BLOCK COPOLYMERS FOR MAKING A MASTER DISK WITH RADIAL BINARY ENCODED NONDATA MARKS FOR NANOIMPRINTING PATTERNED MAGNETIC RECORDING DISKS

BACKGROUND OF THE INVENTION

1. Field of the Invention

This invention relates generally to patterned-media magnetic recording disks, wherein each data bit is stored in a magnetically isolated data island on the disk, and more particularly to a method for making a master disk to be used for nanoimprinting the patterned-media disks with both data islands and binary encoded nondata marks.

2. Description of the Related Art

Magnetic recording hard disk drives with patterned magnetic recording media have been proposed to increase data density. In patterned media, the magnetic recording layer on the disk is patterned into small isolated data islands arranged in concentric data tracks. To produce the required magnetic isolation of the patterned data islands, the magnetic moment of spaces between the islands must be destroyed or substantially reduced to render these spaces essentially nonmagnetic. In one type of patterned media, the data islands are elevated regions or pillars that extend above "trenches" and magnetic material covers both the pillars and the trenches, with the magnetic material in the trenches being rendered nonmagnetic, typically by "poisoning" with a material like silicon (Si). In another type of patterned media, the magnetic material is deposited first on a flat disk substrate. The magnetic data islands are then formed by milling, etching or ion-bombarding of the area surrounding the data islands. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer.

One proposed method for fabricating patterned-media disks is by nanoimprinting with a template or disk, sometimes also called a "stamper", that has a topographic surface pattern. In this method the magnetic recording disk substrate with a polymer film on its surface is pressed against the template. The polymer film receives the reverse image of the template pattern and then becomes a mask for subsequent etching of the disk substrate to form the pillars on the disk. In one type of patterned media, the magnetic layer and other layers needed for the magnetic recording disk are then deposited onto the etched disk substrate and the tops of the pillars to form the patterned-media disk. In another type of patterned media, the magnetic layers and other layers needed for the magnetic recording disk are first deposited on the flat disk substrate. The polymer film used with nanoimprinting is then pressed on top of these layers. The polymer film receives the reverse image of the template pattern and then becomes a mask for subsequent milling, etching or ion-bombarding the underlying layers. The template may be a master disk for directly imprinting the disks. However, the more likely approach is to fabricate a master disk with a pattern of pillars corresponding to the pattern of pillars desired for the disks and to use this master disk to fabricate replica templates. The replica templates will thus have a pattern of recesses or holes corresponding to the pattern of pillars on the master disk. The replica templates are then used to directly imprint the disks. Nanoimprinting of patterned media is described by Bandic et al., "Patterned magnetic media: impact of nanoscale patterning on hard disk drives", *Solid State Technology* S7+Suppl. S, September 2006; and by Terris et al., "TOPICAL REVIEW: Nanofabricated and self-assembled magnetic structures as data storage media", *J. Phys. D: Appl. Phys.* 38 (2005) R199-R222.

In patterned media, the bit-aspect-ratio (BAR) of the pattern or array of discrete data islands arranged in concentric tracks is the ratio of track spacing or pitch in the radial or cross-track direction to the island spacing or pitch in the circumferential or along-the-track direction. This is the same as the ratio of linear island density in bits per inch (BPI) in the along-the-track direction to the track density in tracks per inch (TPI) in the cross-track direction. The BAR is also equal to the ratio of the radial dimension of the bit cell to the circumferential dimension of the bit cell, where the data island is located within the bit cell. The bit cell includes not only the magnetic data island but also one-half of the nonmagnetic space between the data island and its immediately adjacent data islands. The data islands have a ratio of radial length to circumferential width, referred to as the island aspect ratio (IAR), that can be close to or greater than the BAR.

The making of the master template or disk is a difficult and challenging process. The use of electron beam (e-beam) lithography using a Gaussian beam rotary-stage e-beam writer is viewed as a possible method to make a master disk capable of nanoimprinting patterned-media disks with a BAR of about 1 with a track pitch (island-to-island spacing in the radial or cross-track direction) of about 35 nm, and an island pitch (island-to-island spacing in the circumferential or along-the-track direction) of about 35 nm. If the data islands have a radial length and circumferential width each of about 20 nm for an IAR of 1, then these dimensions generally limit the areal bit density of patterned-media disks to about 500 Gbit/in$^2$. To achieve patterned-media disks with both an ultra-high areal bit density (greater than 1 Terabits/in$^2$), a track pitch and an island pitch of about 20 nm will be required. However, a master disk capable of nanoimprinting patterned-media disks with these small dimensions over an area equal to the data area of a disk may not be practical given the speed of e-beam lithography.

Directed self-assembly of block copolymers (BCPs) has also been proposed for making the master disk and is believed capable of achieving areal bit densities of greater than 1 Terabit/in$^2$. U.S. Pat. No. 7,976,715 B2, assigned to the same assignee as this application, describes the use of directed or guided self-assembly of block copolymers to form a pattern of generally radial lines on a master disk substrate, followed by conventional lithography to form a pattern of concentric rings over the radial lines. After removal of resist and one of the block copolymer components, the substrate has a pattern of pillars of the other block copolymer component, which are then used as an etch mask to etch the substrate into a pattern for nanoimprinting disks with discrete data islands arranged in concentric data tracks.

Patterned media disks are also required to have various types of nondata regions, such as synchronization marks that are used to time the reading and/or writing of data and marks in servo sectors that are used to position and maintain the read/write head on the desired data track. These nondata regions are typically interspersed circumferentially around the data tracks and extend across multiple data tracks. It is also necessary that certain of the nondata marks contain binary encoded information that can be read out, for example to identify the track number, the data sector number and/or the servo sector number. However, directed self-assembly of BCPs is capable only of forming the discrete data islands arranged in repetitive patterns in concentric tracks, and is not capable of forming patterned nondata regions simultaneously with the patterned data islands, and thus not capable of forming binary encoded nondata marks.

What is needed is a master disk and a method for making it that can result in patterned-media magnetic recording disks with the required high areal bit density and with patterned nondata regions containing binary encoded nondata marks.

SUMMARY OF THE INVENTION

The invention relates to a method using directed self-assembly of BCPs for making a master disk that has the required patterns for both the data islands and the nondata regions that contain binary encoded nondata marks. The master disk is used in the nanoimprinting process to make patterned-media disks that also have the required nondata regions formed at the same time as the patterned data islands.

The method uses guided self-assembly of a BCP to form patterns of generally radial lines and circumferential gaps of one of the BCP components. The pattern of lines has the BCP components aligned as lamellae perpendicular to the substrate, while the pattern of circumferential gaps has the BCP components aligned as lamellae parallel to the substrate. One of the BCP components is removed, leaving the other BCP component as an etch mask. The pattern of the BCP component that serves as the etch mask comprises sets of radial lines and circumferential gaps, with the gaps preferably having the same gap width as the circumferential width of the sets of radial lines. The sets of radial lines and circumferential gaps can be patterned so as to encode binary numbers. The pattern is replicated as binary encoded nondata marks into the nanoimprinted disks, with the marks functioning as binary numbers for data sector numbers and/or servo sector numbers. If the disks also use a chevron servo pattern, the binary numbers can function to identify groups of tracks associated with the chevron servo pattern.

For a fuller understanding of the nature and advantages of the present invention, reference should be made to the following detailed description taken together with the accompanying figures.

DETAILED DESCRIPTION OF THE INVENTION

Figure 1:
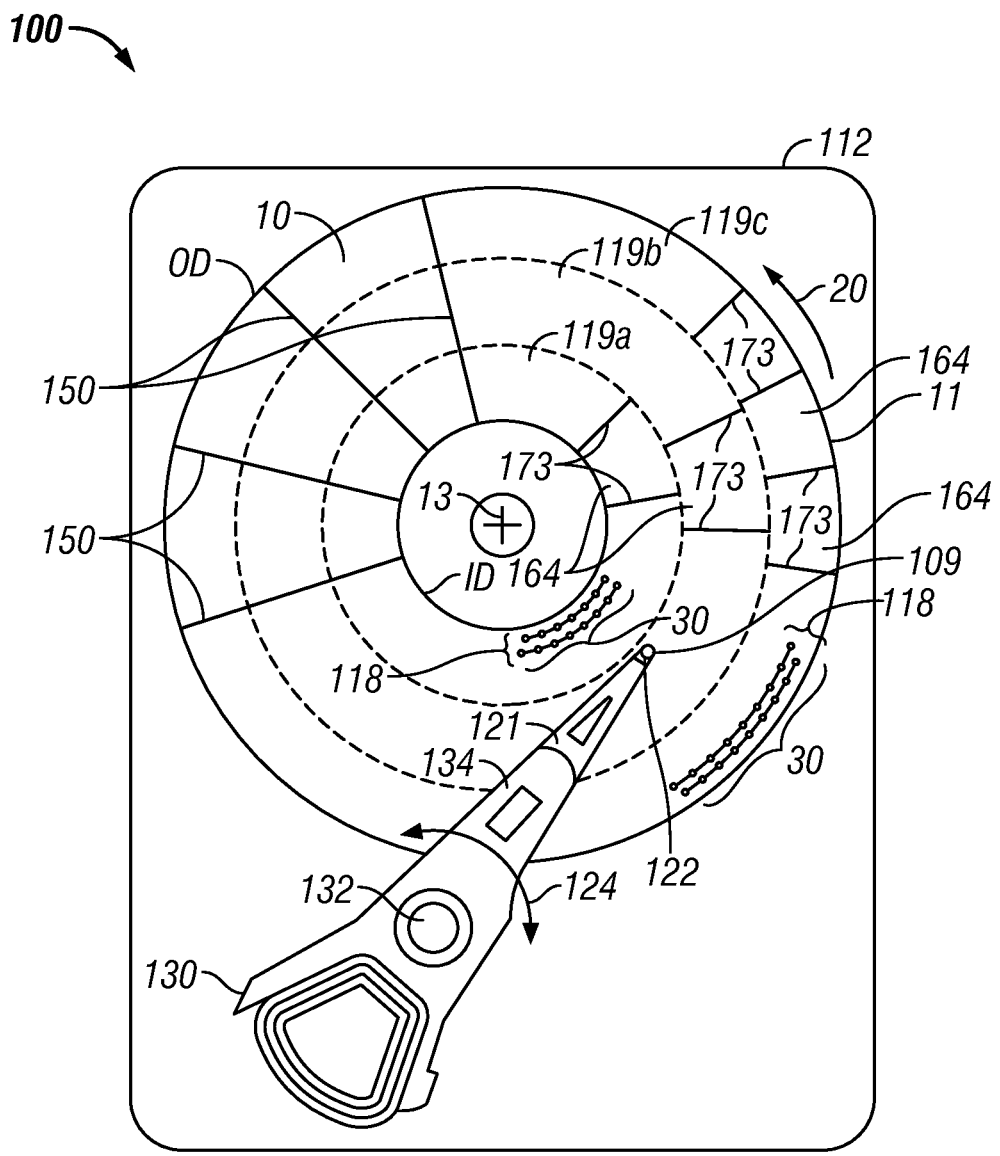
FIG. 1 is a top view of a disk drive with a patterned-media type of magnetic recording disk with generally radial nondata marks as described in the prior art.

FIG. 1 is a top view of a disk drive 100 with a patterned magnetic recording disk 10 as described in the prior art. The drive 100 has a housing or base 112 that supports an actuator 130 and a drive motor for rotating the magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. A read/write head 109 that includes a magnetoresistive read head and an inductive write head are typically formed as an integrated read/write head patterned on the trailing surface of the head carrier 122, as is well known in the art.

The patterned magnetic recording disk 10 includes a disk substrate 11 and discrete data islands 30 of magnetizable material on the substrate 11. The data islands 30 function as discrete magnetic bits for the storage of data and are arranged in radially-spaced circular tracks 118, with the tracks 118 being grouped into annular bands 119a, 119b, 119c. In FIG. 1, only a few islands 30 and representative tracks 118 are shown in the inner band 119a and the outer band 119c. The grouping of the data tracks into annular zones or bands permits banded recording, wherein the angular spacing of the data islands, and thus the data rate, is different in each band. Within each band, the tracks are also circumferentially divided into a number of data fields or sectors, such as typical data sectors 164. Each data sector 164 is preceded by a non-data field, which may be a synchronization (sync) field, such as typical sync fields 173. The sync fields 173 are nondata regions that extend across multiple data tracks and are detectable by the read head for enabling synchronization of reading and writing the data bits in the data sectors 164. The nondata sync fields 173 may also contain a data sector number for identifying the data sector.

As the disk 10 rotates about its center 13 in the direction of arrow 20, the movement of actuator 130 allows the read/write head on the trailing end of head carrier 122 to access different data tracks 118 on disk 10. Rotation of the actuator 130 about pivot 132 to cause the read/write head 109 on the trailing end of head carrier 122 to move from near the disk inside diameter (ID) to near the disk outside diameter (OD) will result in the read/write head making an arcuate path across the disk 10. Each data track also includes a plurality of circumferentially or angularly-spaced servo sectors 150 that contain positioning information detectable by the read head for moving the head 109 to desired data tracks and maintaining the head 109 on the data tracks. The servo sectors in each track are aligned circumferentially with the servo sectors in the other tracks so that they extend across the tracks in a generally radial direction, as represented by radially-directed servo sectors 150. The servo sectors 150 are nondata regions on the disk that are magnetized once, typically during manufacturing or formatting of the disk, and are not intended to be erased during normal operation of the disk drive.

Figure 2:
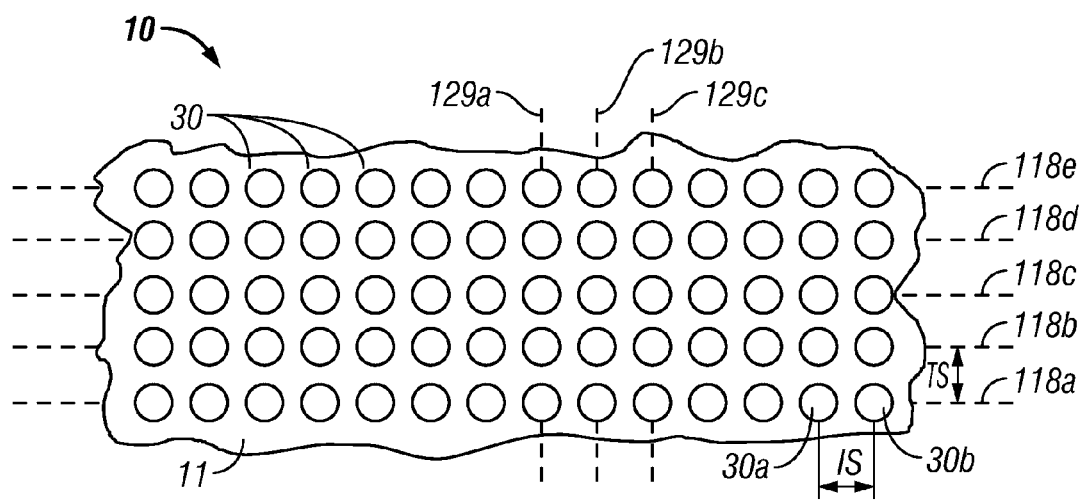
FIG. 2 is a top view of an enlarged portion of a patterned-media type of magnetic recording disk showing the detailed arrangement of the data islands in one of the bands on the surface of the disk substrate.

FIG. 2 is a top view of an enlarged portion of disk 10 showing the detailed arrangement of the data islands 30 in one of the bands on the surface of disk substrate 11 according to the prior art. While the islands 30 are shown as being circularly shaped, they may have other shapes, such as generally rectangularly or generally elliptical. The islands 30 contain magnetizable recording material and are arranged in tracks spaced-apart in the radial or cross-track direction, as shown by tracks 118a-118e. The tracks are typically spaced apart by a nearly fixed track pitch or spacing TS. Within each track 118a-118e, the islands 30 are roughly equally spaced apart by a nearly fixed along-the-track island pitch or spacing IS, as shown by typical islands 30a, 30b, where IS is the spacing between the centers of two adjacent islands in a track. In FIG. 2, TS and IS are depicted as being equal, so the bit aspect ratio (BAR) is 1. The islands 30 are also arranged into generally radial lines, as shown by radial lines 129a, 129b and 129c that extend from disk center 13 (FIG. 1). Because FIG. 2 shows only a very small portion of the disk substrate 11 with only a few of the data islands, the pattern of islands 30 appears to be two sets of perpendicular lines. However, tracks 118a-118e are concentric rings centered about the center 13 of disk 10 and the lines 129a, 129b, 129c are not parallel lines, but radial lines extending from the center 13 of disk 10. Thus the angular spacing between adjacent islands as measured from the center 13 of the disk for adjacent islands in lines 129a and 129b in a radially inner track (like track 118e) is the same as the angular spacing for adjacent islands in lines 129a and 129b in a radially outer track (like track 118a).

The generally radial lines (like lines 129a, 129b, 129c) may be perfectly straight radial lines but are preferably arcs or arcuate-shaped radial lines that replicate the arcuate path of the read/write head on the rotary actuator. Such arcuate-shaped radial lines provide a constant phase position of the data islands as the head sweeps across the data tracks. There is a very small radial offset between the read head and the write head, so that the synchronization field used for writing on a track is actually read from a different track. If the islands between the two tracks are in phase, which is the case if the radial lines are arcuate-shaped, then writing is greatly simplified.

Figure 3:
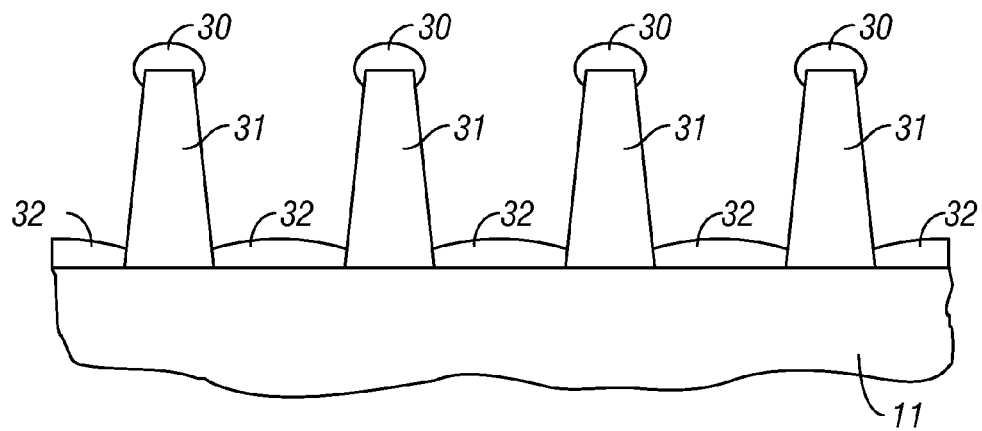
FIG. 3 is a side sectional view of one type of a patterned-media disk showing the data islands as elevated, spaced-apart pillars that extend above the disk substrate surface with trenches between the pillars.

Patterned-media disks like that shown in FIG. 2 may be longitudinal magnetic recording disks, wherein the magnetization directions in the magnetizable recording material are parallel to or in the plane of the recording layer in the islands, or perpendicular magnetic recording disks, wherein the magnetization directions are perpendicular to or out-of-the-plane of the recording layer in the islands. To produce the required magnetic isolation of the patterned data islands, the magnetic moment of the regions between the islands must be destroyed or substantially reduced to render these spaces essentially nonmagnetic. Patterned media may be fabricated by any of several known techniques. In one type of patterned media, the data islands are elevated, spaced-apart pillars that extend above the disk substrate surface to define troughs or trenches on the substrate surface between the pillars. This type of patterned media is shown in the sectional view in FIG. 3. In this type of patterned media the substrate 11 with a pre-etched pattern of pillars 31 and trenches or regions between the pillars can be produced with relatively low-cost, high volume nanoimprinting process using a master template or disk. The magnetic recording layer material is then deposited over the entire surface of the pre-etched substrate to cover both the ends of the pillars 31 and the trenches between the pillars 31, resulting in the data islands 30 of magnetic recording layer material and trenches 32 of magnetic recording layer material. The trenches 32 of recording layer material may be spaced far enough from the read/write head to not adversely affect reading or writing to the recording layer material in islands 30, or the trenches may be rendered nonmagnetic by "poisoning" with a material like Si.

Figure 4:
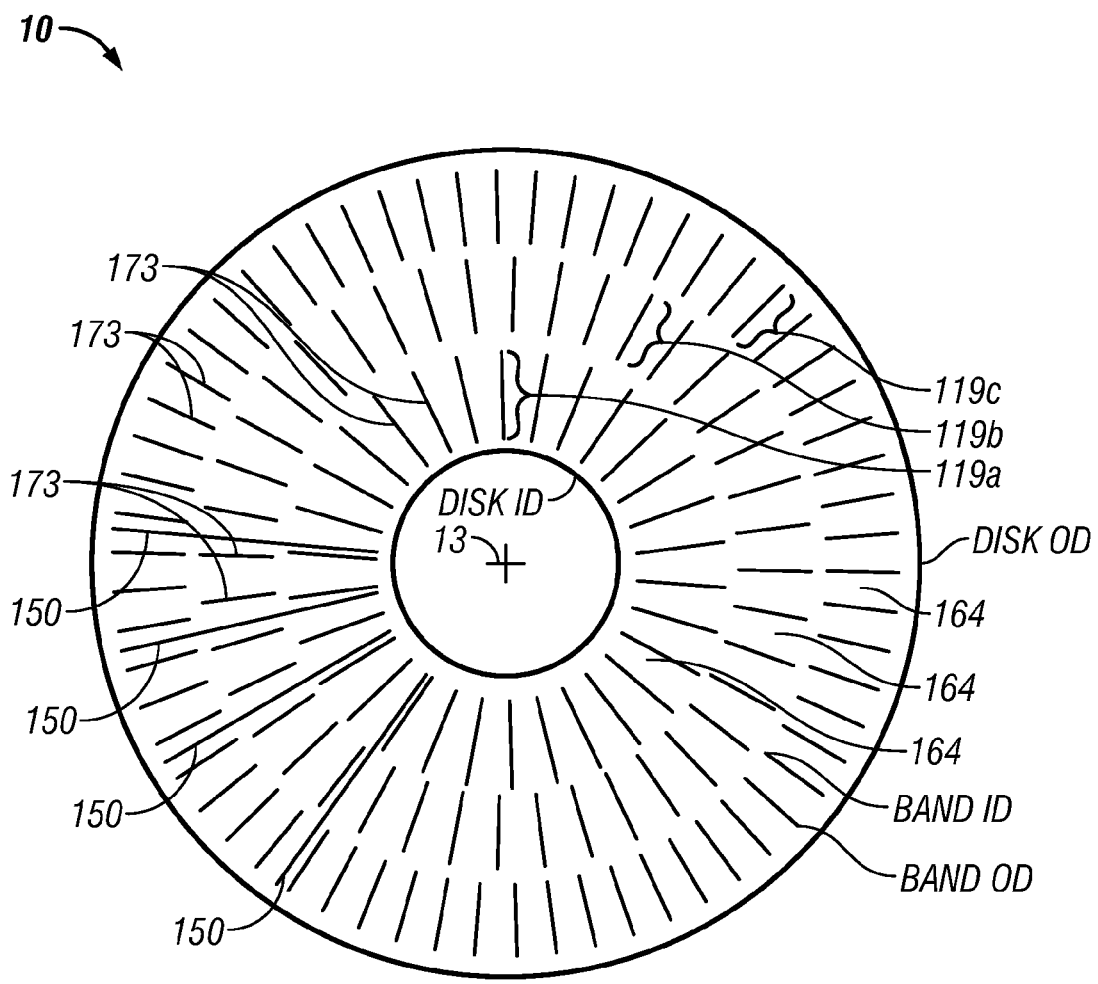
FIG. 4 is a schematic view of a patterned-media disk with patterned nondata regions in three annular bands.

FIG. 4 is a schematic view of patterned-media disk 10 with patterned nondata regions in three annular bands 119a-119c. Each band includes a large number of individual data tracks with patterned data islands (not shown). The radial lines in each band represent nondata sync fields 173 that separate the data fields or sectors 164. Thus each sync field 173 in a band extends radially across all the data tracks in its band. The sync fields 173 or other nondata fields preceding the data sectors 164 may also contain binary encoded nondata marks that represent a number for identifying the data sectors. The circumferential density of the sync fields 173 is similar in all three bands, with the angular spacing of the sync fields 173 being adjusted in the bands to have smaller angular spacing in the direction from the disk inside diameter (ID) to outside diameter (OD). The circumferential density of the sync fields 173, and thus the "linear" or along-the-track density of data islands, stays relatively constant over all the bands on the disk. Also shown in FIG. 4 are typical nondata servo sectors 150 that extend generally radially across all the bands. The servo sectors are generally equally-angularly spaced around the disk. In actuality, a typical disk is divided into about 20 annular bands, which allows the linear bit density to remain constant to within a few percent across all bands. Each annular band, like band 119c, has a band ID and a band OD. Also, in actuality the generally radial sync fields 173 and servo sectors 150 are more typically generally arcuate lines that replicate the path of the read/write head mounted on the end of the rotary actuator.

Figure 5:
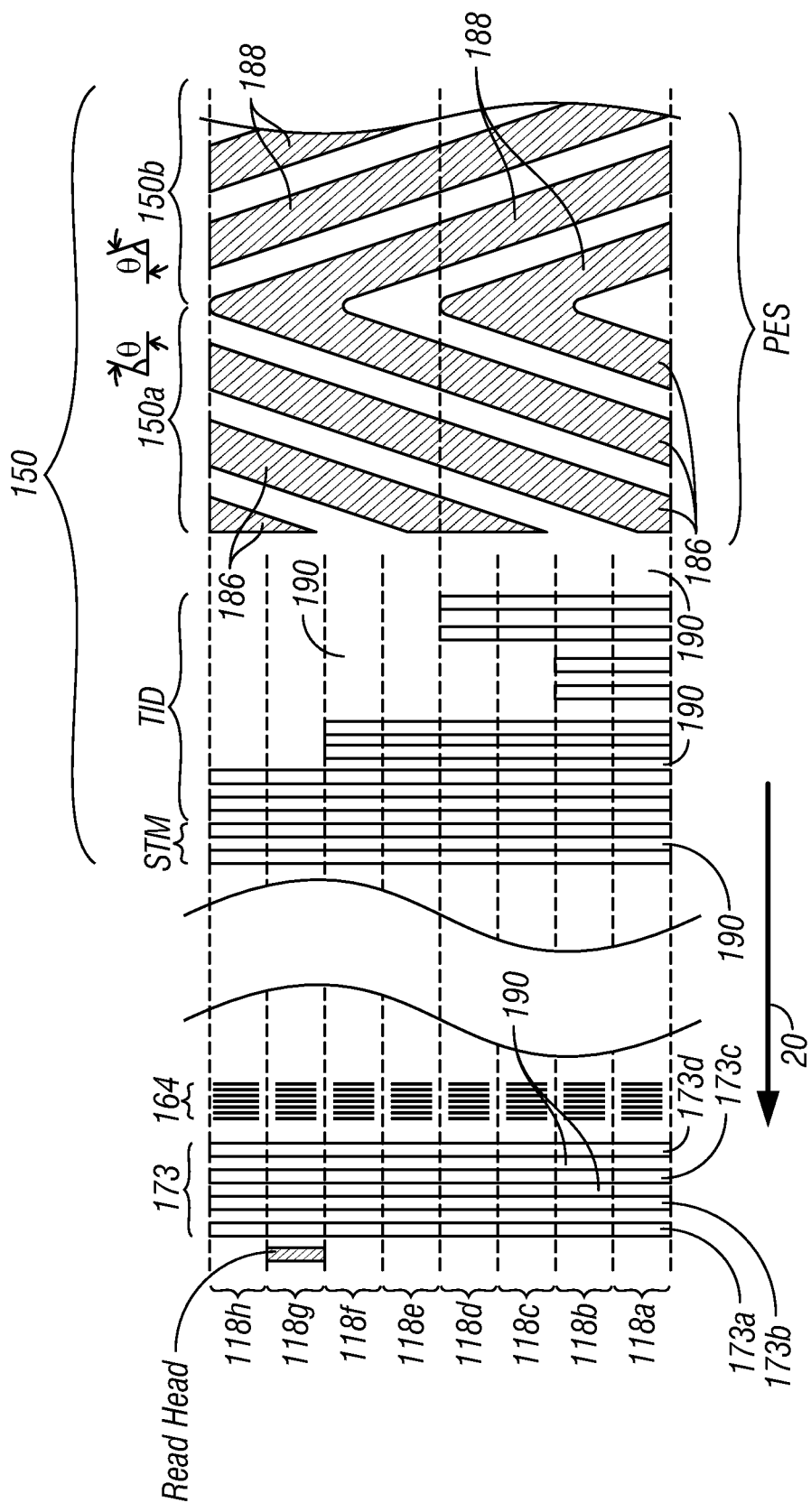
FIG. 5 is a schematic showing a portion of a patterned-media disk with a patterned nondata sync field and a patterned nondata servo sector with a chevron servo pattern spanning several data tracks, as proposed in the prior art.

FIG. 5 is a schematic showing a portion of a patterned-media disk with a patterned nondata sync field 173 and a patterned nondata servo sector 150 spanning several data tracks, as proposed in the prior art. Eight full data tracks 118a-118h are depicted. The read head is shown as positioned in data track 118g and will detect the sync field 173, the data islands in data sector 164 in track 118g and the servo sector 150 as the disk rotates in the direction of arrow 20.

The sync field 173 is depicted with four individual sync marks as magnetized nondata islands 173a-173d separated by nonmagnetic spaces. The sync marks extend across the data tracks in the radial direction, resulting in a single-frequency pattern suitable for locking a phase-locked-loop data clock prior to reading or writing data bits in the data sectors 164. The sync field 173 precedes the data sector 164, which shows several data islands, represented as solid lines. The sync field 173, or a separate nondata field that also extends across all the tracks in a data sector 164, may also contain binary encoded nondata marks that represent a number for identifying the data sectors.

The patterned-media disk 10 also includes patterned servo sectors 150. The servo sector 150 includes a servo-timing-mark (STM) field, a track ID (TID) field and a position-error-signal (PES) field. The STM and TID extend radially across multiple data tracks, typically across at least all the data tracks in an annular band. The STM field, or a separate nondata field, may also contain binary encoded nondata marks that represent a number for identifying the servo sectors. In the patterned-media disk as shown in FIG. 5, the PES field in each of the servo sectors 150 includes a V-shaped pattern or inverted V-shaped pattern (sometimes called a chevron pattern) of circumferentially adjacent fields 150a, 150b of parallel non-radial magnetized stripes 186, 188, respectively. The stripes 186 in field 150a are slanted in one direction (to the right in FIG. 5) relative to data tracks 118 at an acute angle θ, and the stripes 188 in field 150b are slanted in a different direction (to the left in FIG. 5) relative to data tracks 118 at an acute angle, preferably the same angle θ. The stripes 186, 188 are thus also slanted relative to a radial line by an acute angle (90−θ). The stripes 186, 188 are preferably magnetized in the same direction, i.e., in a direction either perpendicularly into or out of the plane of the disk substrate 11, preferably by being DC-magnetized after the disk has been fabricated.

A chevron servo pattern is well-known for conventional disk drives with conventional non-patterned media. The readback signal registers a sinusoid as the read head passes over each of the two fields of the chevron pattern. If the radial position of the head varies, the phase of one sinusoid will be advanced while the phase of the other sinusoid will be retarded. Thus the radial position of the head can be estimated by measuring the phase difference between the two sinusoidal readback signals. Single-frequency Fast Fourier Transform (FFT) methods can generate the necessary phase estimates and are near-maximum-likelihood estimators in the presence of white noise and if the signals are high density. More complex estimators based on non-sinusoidal inputs or more general noise phenomenon can achieve somewhat better performance. The measured phase difference from a chevron servo pattern yields only the fractional part of the head radial position, i.e., the fractional part of one complete radial span of the chevron pattern (which is four data tracks in FIG. 5), because the phase measurement will be the same result for two head positions differing by an integer multiple of the chevron pattern period. As shown in the example of FIG. 5, the chevron pattern repeats every four data tracks. Thus in the conventional servo system with a chevron servo pattern, the integer part of the radial head position, i.e. the actual track number, is typically determined by demodulation of a gray-coded TID, which is typically located near the start of a servo sector before the chevron pattern.

In a servo system for patterned media, like the one shown in this invention, the stripes 186, 188 in the chevron servo fields 150a, 150b are continuous stripes of magnetized material, which will generate a conventional readback signal like that from the well-known chevron servo pattern. However, the stripes 186, 188 may alternatively be comprised of discrete magnetized segments circumferentially spaced with same spacing BP as the data islands, as described in application Ser. No. 12/604,333, assigned to the same assignee as this application. In such an alternative approach, the readback signal would respond to the magnetized segments separated in the circumferential direction by, and at the same time would also be modulated by the spacing and acute angle of the non-radial stripes 186, 188. The result would be a readback signal whose amplitude is modulated by an "envelope" that is similar to the sinusoidal signal from a conventional chevron servo pattern as explained above.

In FIG. 5 all of the islands in sync field 173 and servo sector 150 are discrete islands of magnetic material and are magnetized in the same direction, either perpendicular to the recording layer (either into or out of the paper in FIG. 5) for perpendicular-recording media, or in the plane of the recording layer (either to the right or left in the along-the-track direction in FIG. 5) for horizontal-recording media. The islands are typically DC-magnetized by a large magnet during manufacturing. Each discrete island is a magnetized island separated from other islands by nonmagnetic spaces represented as 190. The term "nonmagnetic" means that the spaces 190 between the islands are formed of a nonferromagnetic material, such as a dielectric, or a material that has no substantial remanent moment in the absence of an applied magnetic field, or a magnetic material in a groove or trench recessed far enough below the islands to not adversely affect reading or writing. The nonmagnetic spaces 190 may also be the absence of magnetic material, such as grooves or troughs in the magnetic recording layer or disk substrate.

As shown schematically in FIG. 5, the nondata islands (sync field 173 and servo sector 150) have a frequency substantially lower than the data islands (data sector 164). This is because for a given resolution of the read head, a modern partial-response (PR) read channel in the disk drive's read/write electronics 113 can handle linear bit densities with a period smaller than the resolution of the read head.

The making of the master template or disk to achieve an ultrahigh density patterned-media disk is a difficult and challenging process. The use of electron beam (e-beam) lithography using a Gaussian beam rotary-stage e-beam writer is viewed as a possible method to make a master disk capable of nanoimprinting patterned-media disks with a BAR of about 1 with a track pitch (island-to-island spacing in the radial or cross-track direction) of about 35 nm, and an island pitch (island-to-island spacing in the circumferential or along-the-track direction) of about 35 nm. If the data islands have a radial length and circumferential width each of about 20 nm for an island aspect ratio (IAR) of 1, then these dimensions generally limit the areal bit density of patterned-media disks to about 500 Gbit/$in^2$. To achieve patterned-media disks with both an ultra-high areal bit density (greater than 1 Terabits/$in^2$), a track pitch and an island pitch of about 25 nm will be required. However, a master disk capable of nanoimprinting patterned-media disks with these small dimensions over an area equal to the data area of a disk is not achievable with the resolution of e-beam lithography.

Directed self-assembly of BCPs has also been proposed for making the master disk and is believed capable of achieving areal bit densities of greater than 1 Terabit/$in^2$. U.S. Pat. No. 7,976,715 B2, assigned to the same assignee as this application, describes the use of directed self-assembly of BCPs to form a pattern of generally radial lines on a master disk substrate, followed by a pattern of concentric rings over the radial lines. After removal of resist and one of the BCP components, the substrate has a pattern of pillars of the other BCP component, which are then used as an etch mask to etch the substrate. This results in a master disk with pillars of substrate material corresponding to the desired pattern of data islands for the patterned-media disks. However, the prior art method of directed self-assembly of BCPs is not capable of simultaneously forming the patterned data islands and nondata regions that extend across multiple tracks, and is thus not capable of forming binary encoded nondata marks that extend across multiple tracks.

The present invention relates to a method using directed self-assembly of BCPs for making a master disk that has the required patterns for both the data islands and the nondata regions, and wherein the nondata regions contain binary encoded nondata marks. The binary encoded nondata marks may be used, for example, for data sector numbers, servo sector numbers or track group numbers for chevron servo patterns. The master disk is used in the nanoimprinting process to make patterned-media disks that also have the required nondata regions with binary encoded nondata marks formed at the same time as the patterned data islands. The binary encoded nondata marks extend across multiple data tracks, either as continuous radial lines or as segmented radial lines with the line segments being aligned with the data tracks.

The method uses guided self-assembly of a BCP to form patterns of generally radial lines and/or generally concentric rings as well as patterns of gap regions of one of the BCP components. The pattern of lines and/or rings have the BCP components aligned as lamellae perpendicular to the substrate, while the pattern of gap regions has the BCP components aligned as lamellae parallel to the substrate. One of the BCP components is removed, leaving the other BCP component as an etch mask to fabricate either the final master disk or two separate molds that are then used to fabricate the master disk.

Self-assembling BCPs have been proposed for creating periodic nanometer (nm) scale features. A self-assembling BCP typically contains two or more different polymeric block components, for example components A and B, that are immiscible with one another. Under suitable conditions, the two or more immiscible polymeric block components separate into two or more different phases or microdomains on a nanometer scale and thereby form ordered patterns of isolated nano-sized structural units. There are many types of BCPs that can be used for forming the self-assembled periodic patterns. If one of the components A or B is selectively removable without having to remove the other, then an orderly arranged structural units of the un-removed component can be formed.

Specific examples of suitable BCPs that can be used for forming the self-assembled periodic patterns include, but are not limited to: poly(styrene-block-methyl methacrylate) (PS-b-PMMA), poly(ethylene oxide-block-isoprene) (PEO-b-PI), poly(ethylene oxide-block-butadiene) (PEO-b-PBD), poly(ethylene oxide-block-styrene) (PEO-b-PS), poly(ethylene oxide-block-methylmethacrylate) (PEO-b-PMMA), poly(ethyleneoxide-block-ethylethylene) (PEO-b-PEE), poly(styrene-block-vinylpyridine) (PS-b-PVP), poly(styrene-block-isoprene) (PS-b-PI), poly(styrene-block-butadiene) (PS-b-PBD), poly(styrene-block-ferrocenyldimethylsilane) (PS-b-PFS), poly(butadiene-block-vinylpyridine) (PBD-b-PVP), poly(isoprene-block-methyl methacrylate) (PI-b-PMMA), and poly(styrene-block-dymethylsiloxane) (PS-b-PDMS).

The specific self-assembled periodic patterns formed by the BCP are determined by the molecular volume ratio between the first and second polymeric block components A and B. When the ratio of the molecular volume of the second polymeric block component B over the molecular volume of the first polymeric block component A is less than about 80:20 but greater than about 60:40, the BCP will form an ordered array of cylinders composed of the first polymeric block component A in a matrix composed of the second polymeric block component B. When the ratio of the molecular volume of the first polymeric block component A over the molecular volume of the second polymeric block component B is less than about 60:40 but is greater than about 40:60, the BCP will form alternating lamellae composed of the first and second polymeric block components A and B. In the present invention, the un-removed component is to be used as an etch mask, so ordered arrays of alternating lamellae and alternating cylinders are of interest.

The periodicity or bulk period ($L_0$) of the repeating structural units in the periodic pattern is determined by intrinsic polymeric properties such as the degree of polymerization N and the Flory-Huggins interaction parameter $\chi$. $L_0$ scales with the degree of polymerization N, which in turn correlates with the molecular weight M. Therefore, by adjusting the total molecular weight of the BCP of the present invention, the bulk period ($L_0$) of the repeating structural units can be selected.

To form the self-assembled periodic patterns, the BCP is first dissolved in a suitable solvent system to form a BCP solution, which is then applied onto a surface to form a thin BCP layer, followed by annealing of the thin BCP layer, which causes phase separation between the different polymeric block components contained in the BCP. The solvent system used for dissolving the BCP and forming the BCP solution may comprise any suitable non-polar solvent, including, but not limited to: toluene, propylene glycol monomethyl ether acetate (PGMEA), propylene glycol monomethyl ether (PGME), and acetone. The BCP solution can be applied to the substrate surface by any suitable techniques, including, but not limited to: spin casting, coating, spraying, ink coating, dip coating, etc. Preferably, the BCP solution is spin cast onto the substrate surface to form a thin BCP layer. After application of the thin BCP layer onto the substrate surface, the entire substrate is annealed to effectuate microphase segregation of the different block components contained by the BCP, thereby forming the periodic patterns with repeating structural units.

The BCP films in the above-described techniques self-assemble without any direction or guidance. This undirected self-assembly results in patterns with defects so it is not practical for applications that require long-range ordering, such as for making annular bands of radial lines on a master disk for nanoimprinting patterned-media disks. However, directed or guided self-assembly of a BCP to form patterns of generally radial lines and/or generally concentric rings of one of the BCP components is described in U.S. Pat. No. 7,976,715 B2, assigned to the same assignee as this application.

In a first implementation of the invention two separate molds are fabricated, one with generally radial lines and circumferential gap regions and one with generally concentric rings and possibly gap regions. The radial lines are formed as sets with a fixed number of radial lines. The sets of radial lines and circumferential gaps can represent a binary 1 or 0, and can be patterned to form binary encoded numbers. The two molds are then used to make the master disk. The method for making each mold is explained with respect to FIGS. 6A-6J. FIGS. 6A-6C, 6E-6G and 6J are side sectional views, at various stages of the fabrication method, and FIGS. 6D, 6H and 6I are top views at various stages of the method. The method will be described in FIGS. 6A-6J for making a mold with generally radial lines and gap regions, but the method is identical for making a mold with generally concentric rings and circumferential gap regions that divide the rings into sections of rings.

Figure 6A:
FIGS. 6A-6J are views of a small portion of one annular band of a mold at successive stages of making a mold to be used in making the master disk according to the invention.

Referring first to FIG. 6A, the substrate 200 comprises a base 200, which may be formed of any suitable material, such as, but not limited to, single-crystal Si, amorphous Si, silica, quartz, silicon nitride, carbon, tantalum, molybdenum, chromium, alumina and sapphire. A nearly neutral layer 205 of a material that does not show a strong wetting affinity by one of the polymer blocks over the other, that will be referred to as "neutral layer", is deposited onto the substrate 200. The neutral layer can be, but is not restricted to, a functionalized polymer brush, a cross-linkable polymer, a functionalized polymer "A" or "B" or a functionalized random copolymer "A-r-B". The functional group may be, for example, a hydroxyl group. In the present example, the neutral layer 205 is a hydroxyl-terminated polystyrene brush of lower molecular weight than the BCP used. The brush material is spin-coated on substrate 200 to a thickness of about 1-10 nm (below 6 nm is preferred). The purpose of the neutral layer is to tune the surface energy adequately to promote the desired domain orientation (perpendicular lamellae) and to provide the adequate wetting conditions for density multiplication.

Figure 6B:
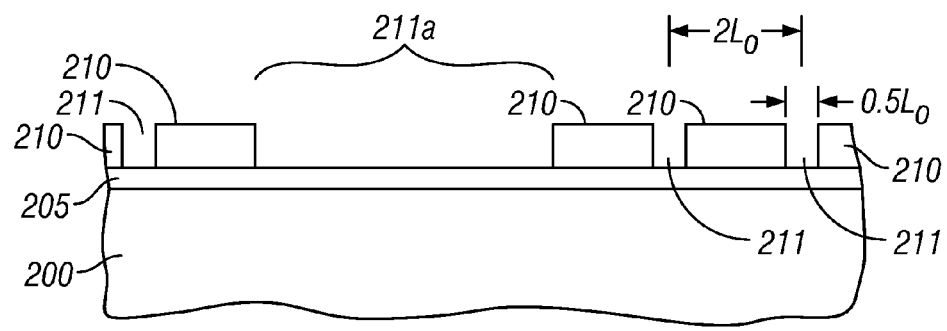

In FIG. 6B a resist layer has been deposited on neutral layer 205 and patterned into generally radial bars 210 of resist. The resist may be a positive e-beam resist like poly methyl methacrylate (PMMA) or ZEP520 from Zeon Chemicals, L.P. The resist layer is patterned by e-beam and developed to form the pattern of radial bars 210 separated by radial stripes 211 and by a radial gap region 211a that expose portions of neutral layer 205. The e-beam tool patterns the resist layer so that the radial stripes 211 have a circumferential spacing or stripe pitch that is approximately an integer multiple of $L_0$ (i.e., $nL_0$), the known bulk period for the selected BCP that will be subsequently deposited. In FIG. 6B, n is 2. The e-beam tool also patterns the resist layer so that the gap region 211a has the desired circumferential width. Only one gap region 211a is depicted, but there would typically be multiple gap regions circumferentially spaced around the substrate to help form the nondata regions in the nanoimprinted disk. The circumferential width of each radial stripe 211 is selected to be approximately $0.5 L_0$.

Figure 6C:
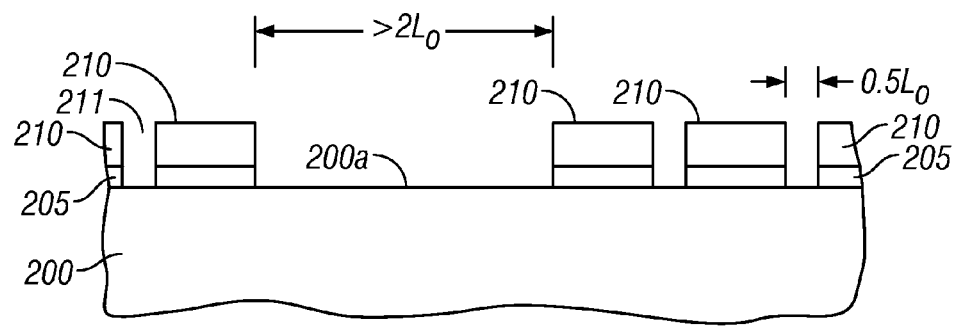
Figure 6D:
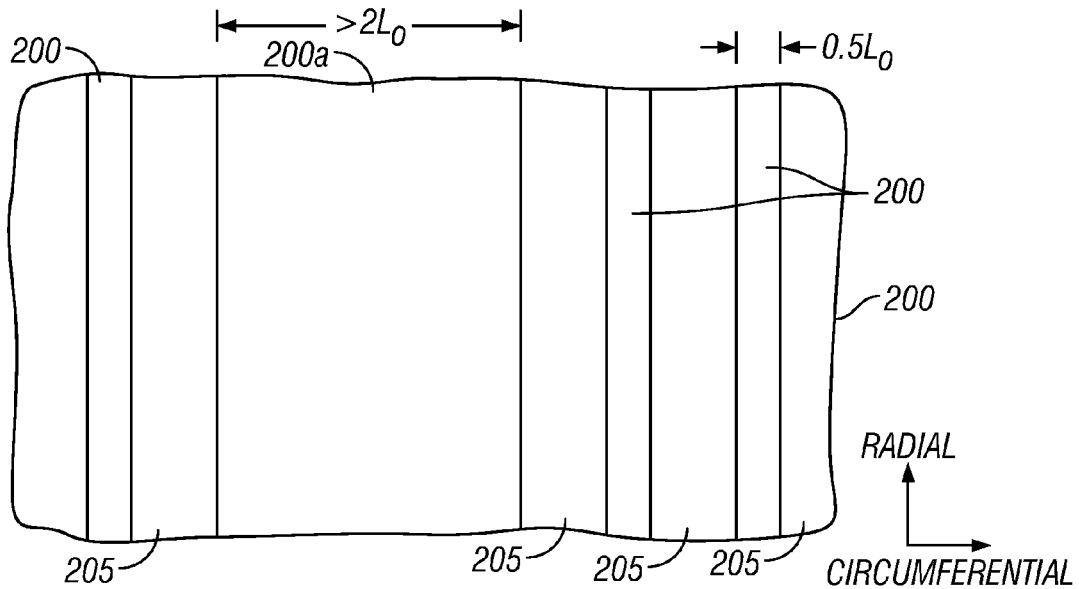

In FIG. 6C, the structure is etched, by a process of oxygen plasma reactive ion etching ($O_2$ RIE), to remove portions of neutral layer 205 in the radial stripes 211 and gap region 211a, which exposes the substrate 200. Alternatively, the chemical structure of the exposed portions of neutral layer 205 in the radial stripes 211 and gap region 211a can be chemically damaged or altered (by oxygen plasma etching or other process such as reactive ion etching, neutral atom (such as Ar) or molecule milling, ion bombardment and photodegradation) so that the exposed portions of neutral layer 205 have a preferred affinity (or repulsion) for one of the copolymers. In FIG. 6D, which is a top view, the resist 210 is removed, leaving on the substrate 200 a pattern of generally radial bars 205 of polymer brush material and generally radial stripes 200 and gap region 200a of exposed substrate (or chemically altered neutral layer material). In this pattern the generally radial stripes 200 have a circumferential width of $0.5 L_0$ and a circumferential pitch of $2 L_0$ and the gap region has a circumferential width greater than $2 L_0$. Because FIG. 6D is only a very small portion of the master disk, the stripes 200 and gap region 200a appear as parallel stripes. However, the stripes 200 and gap region 200a are arranged generally radially, as depicted in FIG. 4. The stripes 200 and gap region 200a may be perfectly radially straight but are preferably arcs or arcuate-shaped so as to replicate the arcuate path of the read/write head on the rotary actuator.

Figure 6E:
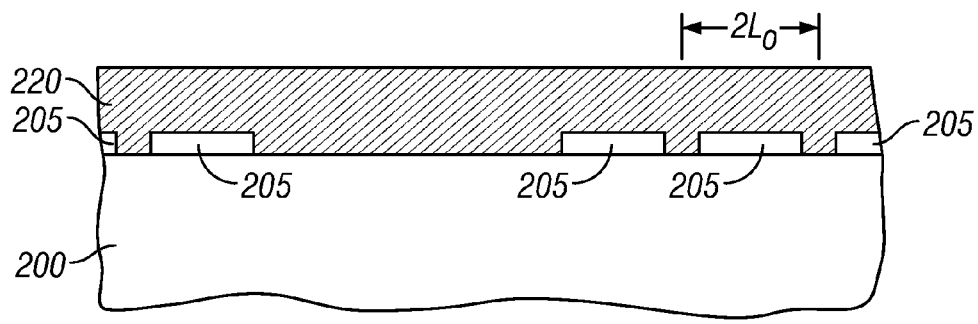

Next, in FIG. 6E, a layer 220 of BCP material is deposited over the radial bars 205 of brush material and onto the exposed substrate 200. The preferred BCP material is the lamellae-forming diblock copolymer polystyrene-block-polymethylmethacrylate (PS-b-PMMA) with $L_0$ between about 8 nm and 30 nm and is deposited by spin coating to a thickness of about $0.5 L_0$ to $3 L_0$.

Figure 6F:
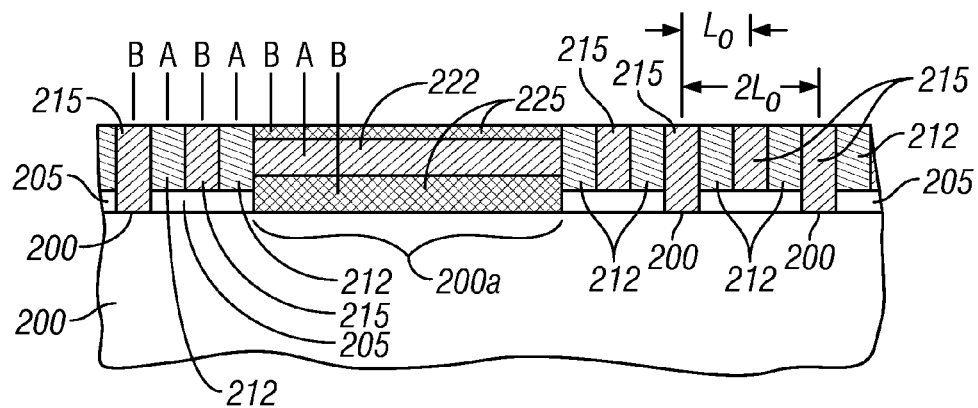

In FIG. 6F, the BCP layer has been annealed, for example by heating to about 250° C. for approximately 60 minutes under nitrogen atmosphere, which results in phase separation between the A and B components contained in the BCP. Alternatively, the BCP can be "annealed" by exposure to vapor that is the same or similar to the non-polar solvent that was used to dissolve the BCP into solution. The exposure to vapor, also called "solvent annealing", will lower the glass transition temperature Tg of the BCP layer below room temperature when exposed to the vapor. After the vapor is removed (or purged) the A and B components of the BCP will be in their final phase-separated state. In this example, the B component (PMMA) has an affinity for the substrate surface 200 (or for the polar groups of the chemically altered neutral layer material) and thus form as generally radial lines 215 on top of the radial stripes 200. Because the circumferential width of the stripes 200 is approximately $0.5 L_0$, the A component (PS) form in adjacent radial lines 212 on the radial bars 205 of polymer brush material. As a result of the self-assembly of the A and B components this causes the B component to also form as generally radial lines 215 on the centers of each radial bar 205 of polymer brush material. The generally radial stripes 200 thus guide the self-assembly of the PS and PMMA components to form the alternating radial lines 212, 215 in the structure as shown in FIG. 6F. The A and B BCP components in the radial lines 212, 215 become arranged as lamellae perpendicular to the substrate.

Although the A and B components prefer to self-assemble in parallel lines 212, 215 with a period of $L_0$, the substrate pattern of radial stripes 200 guides the alternating lines 212, 215 to form as radial lines, which means that that $L_0$ cannot be constant over the entire radial length. However, a pattern of alternating radial lines 212, 215 can be accomplished without any significant defects if the variation from $L_0$ does not exceed approximately 10 percent. Thus, to achieve this, the circumferential spacing of the radial stripes 200 at the band ID should not be less than about $0.9 nL_0$ and the circumferential spacing of the radial stripes 200 at the band OD should not be greater than about $1.1 nL_0$ (n is an integer).

However, because the exposed gap region 200a of the substrate has a circumferential width greater than $2 L_0$, the A and B BCP components cannot form as lamellae perpendicular to the substrate but instead become arranged as lamellae parallel to the substrate. This is shown in FIG. 6F with A component 222 on substrate 200 in gap region 200a, B component 225 on top of the lower A component 222, and A component 222 on top of B component 225, all oriented as lamellae parallel to the substrate.

Figure 6G:
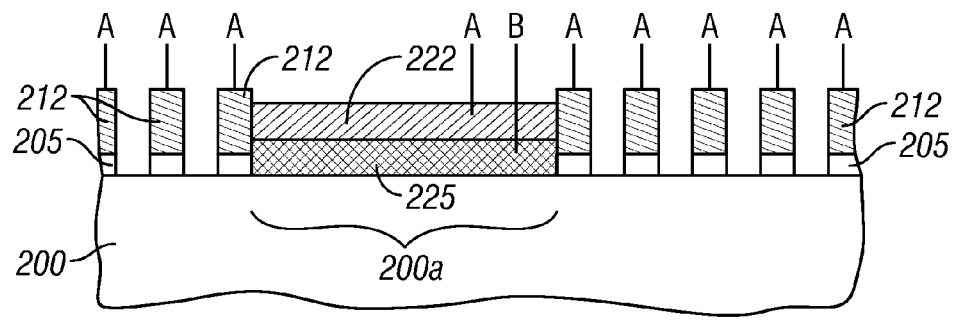
Figure 6H:
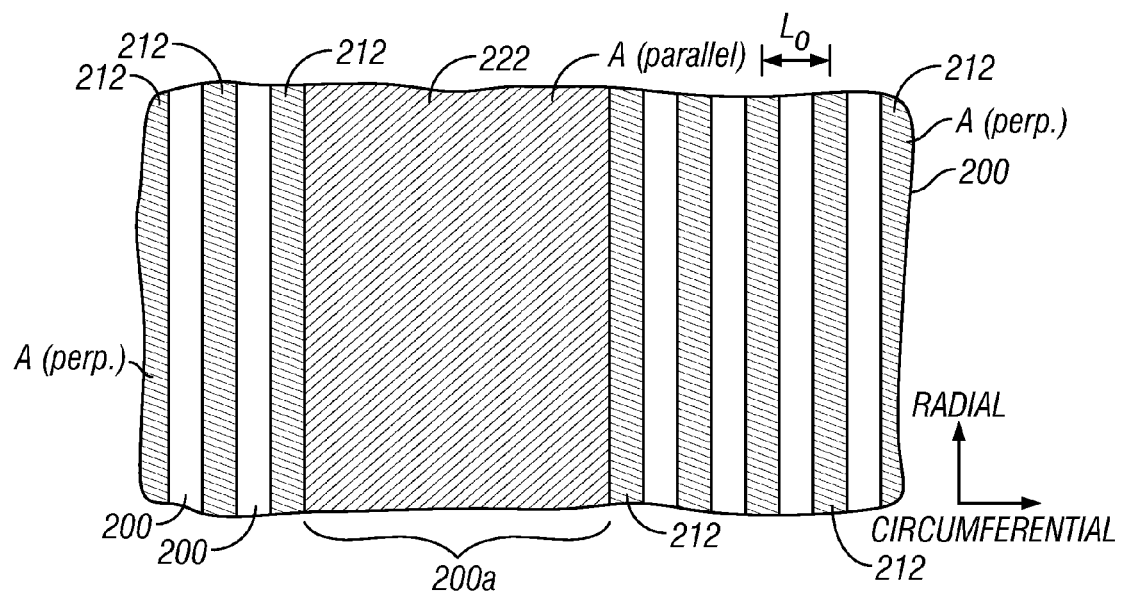
Figure 6I:
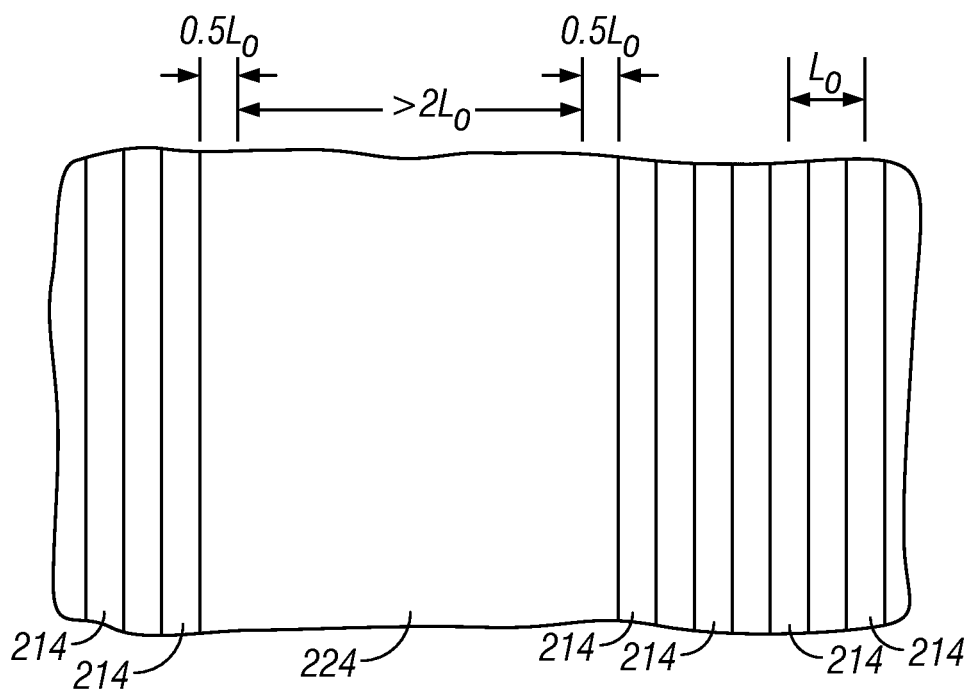

Next, in FIG. 6G, the B component (PMMA) is selectively removed by a wet etch (acetic acid, IPA or other selective solvent) or a dry etch process ($O_2$ RIE), leaving generally radial lines 212 of the A component (PS) arranged as lamellae perpendicular to the substrate and the A component 222 (and underlying B component 225) in gap region 200a arranged as a lamellae parallel to the substrate.

FIG. 6H is a top view of FIG. 6G and shows the generally radial A-component lines 212 (oriented perpendicular to the substrate) with a circumferential spacing $L_0$ and the A-component 222 (oriented parallel to the substrate) in gap region 200a. In FIG. 6H the circumferential density of radial lines 212 has been doubled from the circumferential density of radial stripes 200 in FIG. 6D. The A-component radial lines 212 and A-component 222 in gap region 200a are then used as an etch mask to etch away unprotected portions of the substrate 200.

Figure 6J:
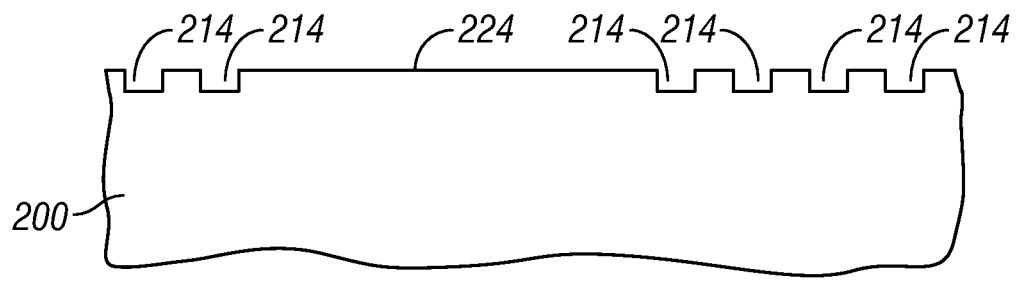

After the substrate 200 has been etched, the A-component radial lines 212 (and underlying neutral layer 205) and the A-component 222 (and underlying B-component 225) are removed by a $O_2$ RIE process or by forming gas RIE or ashing or by a wet process. The resulting structure is shown in the top view of FIG. 6I and the sectional view of FIG. 6J. The etched substrate has etched recesses 214 which are arranged as generally radial lines with a circumferential spacing $L_0$. Because the gap region 224 (and its two adjacent radial lines) were protected by the A-component etch mask, no recesses were formed in this area. The gap region 224 is now the surface of substrate 200 (as shown in FIG. 6J) with a circumferential gap width equal to the gap width of the A-component lamellae parallel to the substrate (which is greater than $2 L_0$) plus the circumferential width of the two adjacent radial lines of the A component ($L_0$). The portions of the substrate that were protected by the A-component etch mask can be considered as substrate pillars separated by recesses, as shown in FIG. 6J. The etched substrate 200 can now function as a first mold to be used to pattern generally radial lines and gap regions in the making of the master disk.

Figure 7:
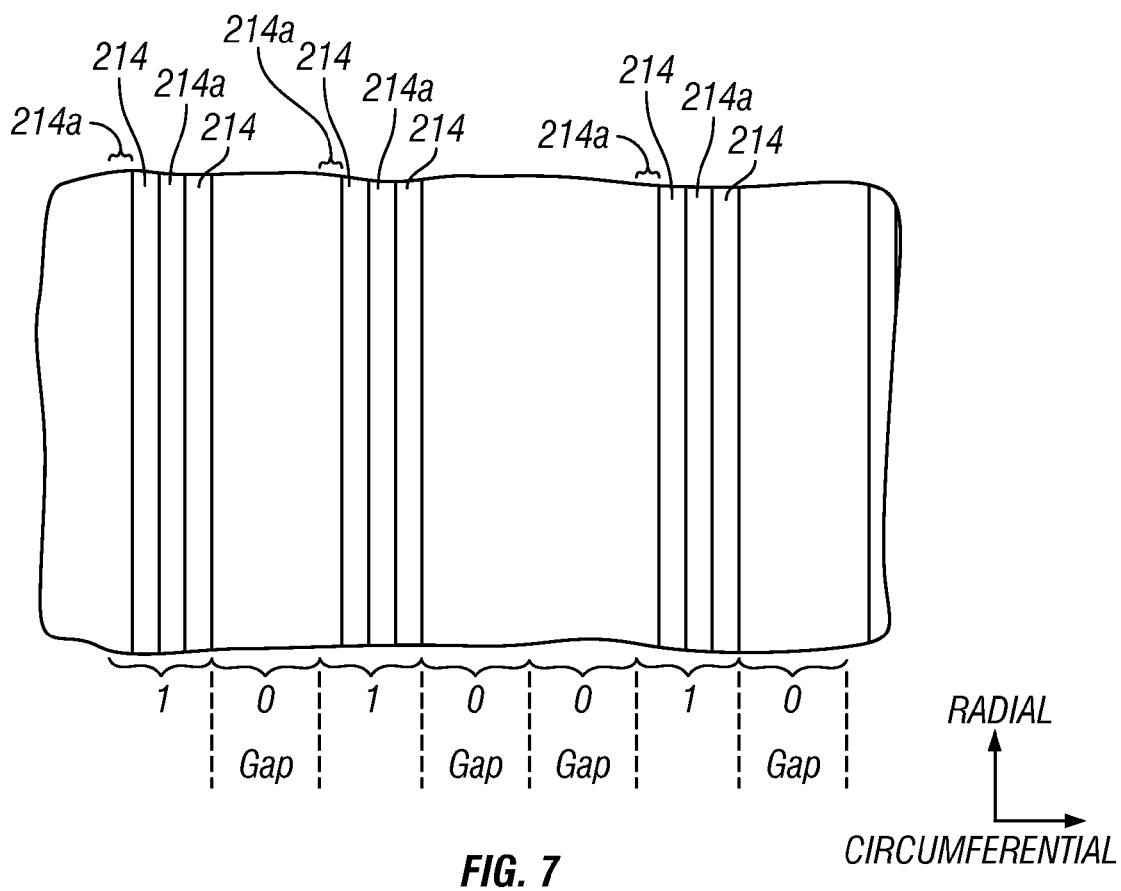
FIG. 7 is a top view of a mold made according to the invention with patterns that will replicate binary encoded nondata marks onto the completed nanoimprinted disk.

In this invention the process described above for making the mold shown in FIGS. 6I-6J is used to form binary encoded patterns that will replicate into the completed nanoimprinted disks. This is shown in FIG. 7, which is a top view of a mold like the top view of the mold shown in FIG. 6I. In FIG. 7, there are two radial recesses 214 and two non-recessed regions 214a in each radial line set and each set represents a binary 1. In this example the circumferential width of a radial line set is 2 $L_0$ but can be made larger. Each circumferential gap preferably has a gap width equal to the circumferential width of a set of radial lines and represents a binary 0. The binary 0 and 1 can be selected to be either the sets of radial lines or the circumferential gaps, and there can be more than two radial recesses in each radial line set. Thus the binary encoded pattern of sets of radial lines and circumferential gaps will replicate into the nanoimprinted disks and can be used as data sector numbers (such as in nondata fields 173 in FIG. 4) or as servo sector numbers (such as in nondata servo fields 150 in FIG. 4) that extend across multiple data tracks.

The same process as described above with respect to FIGS. 6A-6J can be used to make the second mold to be used to pattern concentric rings and optional circumferential gap regions in the making of the master disk. The only difference is that in FIG. 6B the resist layer deposited on neutral layer 205 is patterned into concentric bars 210 of resist with concentric stripes 211 and optional circumferential gap regions 200a. An example of the patterning of the resist layer for the mold to make the concentric rings is shown in the top view of FIG. 8. The e-beam tool patterns the resist layer so that the concentric stripes 211 between the concentric bars 205 have a radial width of 0.5 $L_0$ and a radial spacing or stripe pitch that is approximately an integer multiple of $L_0$ (i.e., $nL_0$, where n=2 in FIG. 8), where $L_0$ is the known bulk period for the selected BCP that will be subsequently deposited and which may have a different value of $L_0$ from the one used in forming the radial lines. The gap region 200a separates the concentric bars 205 into circumferentially spaced sections of concentric bars.

To make the master disk using the two molds, one with the pattern of generally radial lines and gap regions and the other with the pattern of generally concentric rings, the master disk substrate is covered with a protective layer and a resist layer. The master disk substrate may be formed of any suitable material, such as, but not limited to, single-crystal Si, amorphous Si, silica, quartz, silicon nitride, carbon, tantalum, molybdenum, chromium, alumina and sapphire. The protective layer may be formed of Cr, $SiO_2$, or multilayers thereof. The first mold, for example the one with radial lines (with or without gap regions), is impressed on the resist layer, and the resulting resist pattern is used as an etch mask to etch away the protective layer not covered by the resist, leaving lines of resist and underlying protective layer corresponding to the pattern of the first mold. The remaining resist is removed by a dry or wet process. The substrate is coated again with imprint resist. The second mold, the one with concentric rings and circumferential gap regions, is then impressed on the resist with the rings of the second mold intersecting the protective layer lines formed in the first pattern. The resulting resist pattern is used either as an etch mask or as a liftoff mask to form pillar-tone or hole-tone templates respectively. When used for pillar-tone, the resist pattern is used as a mask to etch away remaining portions of the protective layer not covered by the resist, leaving pillars of resist and underlying protective layer. The pillars then serve as an etch mask for an etching process that etches unprotected portions of the master disk substrate.

Figure 9A:
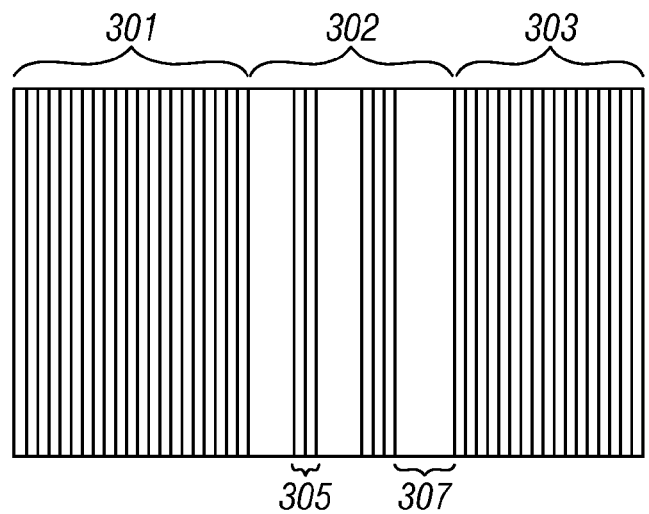
FIGS. 9A-9C show one example of how the two molds made by the process of this invention can be used to make a master disk with the desired pattern for both data sectors with data tracks and binary encoded nondata radial marks between the data sectors.
Figure 9B:
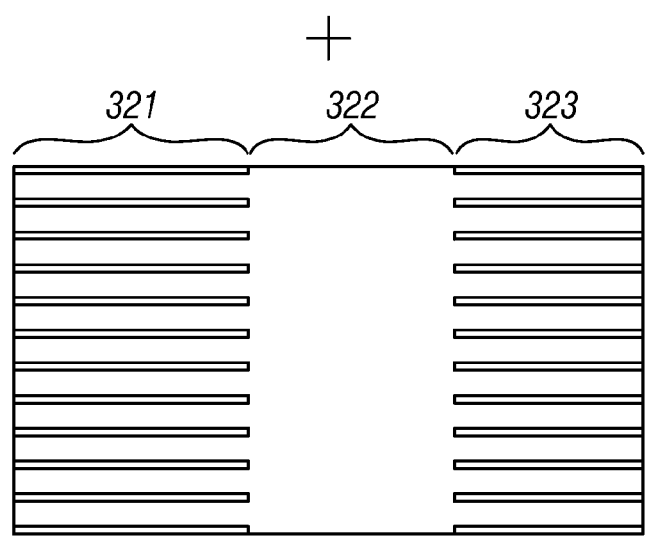
Figure 9C:
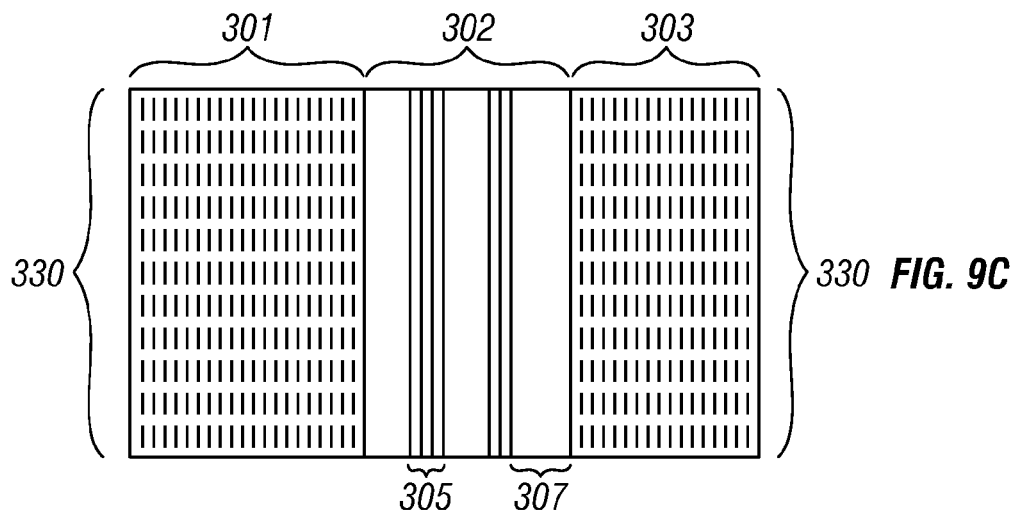

FIGS. 9A-9C show one example of how the two molds made by the process of this invention can be used to make a master disk with the desired pattern for both data sectors with data tracks and binary encoded nondata radial marks between the data sectors. FIG. 9A shows the top view of a mold made according to the above-described self-assembling BCP process, similar to the mold in FIG. 7, with two angular sectors 301, 303 of radial lines with a binary encoded pattern 302 between radial line sectors 301, 303. The binary encoded pattern 302 includes one or more sets of radial lines, like radial line set 305, and one or more sets of circumferential gaps, like gap 307. The pattern 302 may represent the binary encoded number for sector 303. FIG. 9B shows a mold with concentric rings and a circumferential gap region 322 made according to the above-described self-assembling BCP process. The gap region 322 separates the concentric rings into ring sections 321, 323. As used herein the term "rings" includes sections of rings, like section 321, 323. In FIG. 9B the concentric ring sections 321, 323 were formed with the neutral layer patterned such that the A and B components of the BCP formed as lamellae perpendicular to the substrate so as to form the concentric rings with a radial spacing of $nL_0$ (where $L_0$ is the bulk period of the BCP selected for making the concentric rings and which may be different from the $L_0$ of the BCP selected for making the radial lines in the mold of FIG. 9A). However, the neutral layer was patterned in the circumferential gap region 322 so as to form the A and B components of the BCP parallel to the substrates so that each of the circumferential gap region 322 has a circumferential width greater than 2 $L_0$. FIG. 9C shows the top view of a master disk made using the molds of FIGS. 9A and 9B. The master disk is depicted with two data sectors 301, 303 with 11 concentric data tracks 330 with discrete data islands. The binary encoded pattern 302 is depicted as extending radially across the data tracks. The binary encoded pattern 302 will replicate into the nanoimprinted disks and can function as data sector numbers or servo sector numbers. In FIGS. 9A-9C, the mold of FIG. 9B has concentric ring sections 321,323 and a circumferential gap 322 between them which results in the radial line sets 305 of the binary encoded pattern 302 extending as continuous lines generally radially across the data tracks. However, the mold of FIG. 9B can be made without the circumferential gap 322, in which case the radial line sets 305 would become segmented and aligned with the individual data tracks. However, the binary encoded pattern with the sets of radial line segments would be the same in each track.

Figure 8:
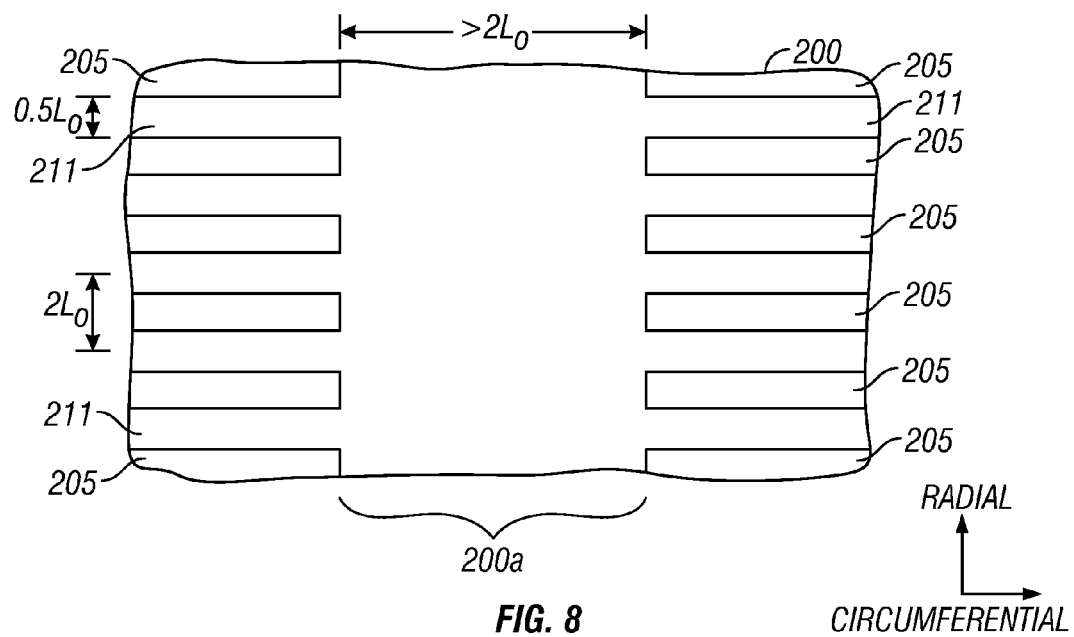
FIG. 8 is a top view showing a second mold with a neutral layer patterned by e-beam into concentric bars and gap regions.

In a second implementation of the method, the master disk is made directly. This method uses the method described in U.S. Pat. No. 7,976,715 B2, assigned to the same assignee as this application and which is incorporated herein by reference, but incorporates the method for making the gap regions simultaneously with the radial lines and/or concentric rings. This implementation of the method uses a first BCP material with bulk period $L_0=L_{rad}$, resulting in guided self-assembly of the first BCP into its components to multiply the generally radial stripes into generally radial lines of alternating first BCP components, and with optional formation of the first BCP components as lamellae parallel to the substrate to form optional gap regions. One of the first BCP components is removed, leaving the radial lines of the remaining first BCP component and the remaining first BCP component in the gap regions. The resulting structure is as shown in FIGS. 6G-6H. An optional protective layer is then deposited over the remaining component of the first BCP. The protective layer may be Si, SiO$_2$, alumina (Al$_2$O$_3$) or similar material sputter deposited to a thickness of approximately 1-2 nm. The purpose of the protective layer is to prevent movement and/or dissolving of the remaining first BCP component during subsequent processing. Then, a second neutral layer is deposited on the protective layer. A resist layer is applied over the second neutral layer and patterned by e-beam into concentric bars and gap regions, as depicted in FIG. 8. Then a second BCP with bulk period $L_0$=$L_{circ}$ is deposited over these concentric bars and gap regions to define generally concentric rings and gap regions. One of the components of the second BCP is removed, leaving the concentric rings of the remaining second BCP component and the remaining second BCP component in the gap regions. The concentric rings of one of the components of the second BCP are removed, leaving the concentric rings of the remaining component of the second BCP. The concentric rings and gap regions of the remaining second BCP component and the underlying radial lines and gap regions of the remaining first BCP component form a grid that functions as an etch mask. Etching of the substrate through this mask, followed by removal of the remaining BCP material, results in a master mold with a pattern of recesses or holes. The ratio of $L_{circ}/L_{rad}$ defines the BAR for the disk made from the master disk. If $L_{circ}$=$L_{rad}$ then the BAR would be 1, but the BAR can be made greater than 1 by appropriate selection of the two BCPs with different bulk ratios, $L_0$.

Figure 10:
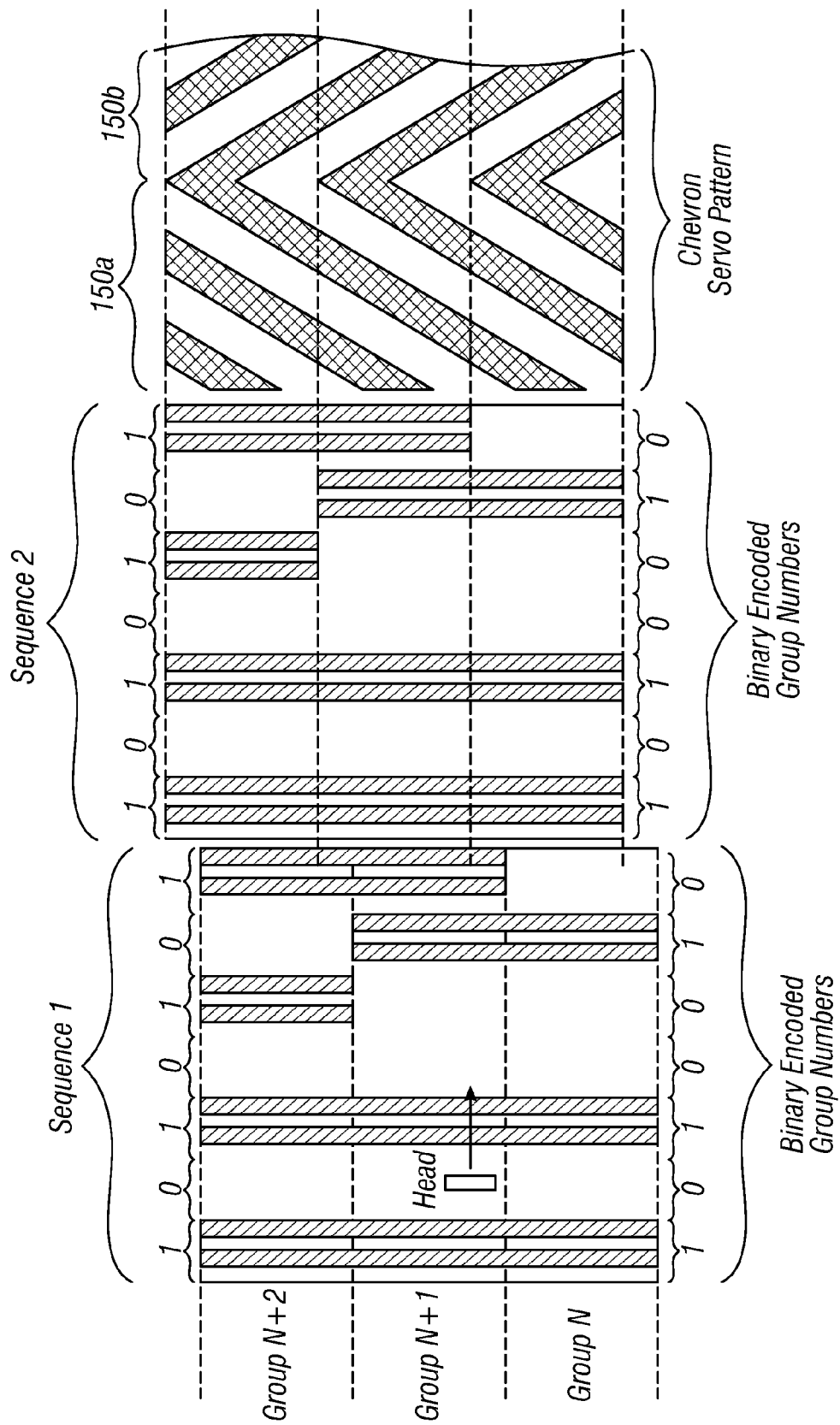
FIG. 10 is a view of a portion of a disk nanoimprinted by a mold or master disk made by the self-assembling BCP process of the invention wherein the binary encoded nondata marks can be used as track group numbers associated with a chevron servo pattern.

FIG. 7 is an illustration of how the self-assembling BCP process of the invention can be used to make both perpendicular lamellae and parallel lamellae that result in a mold that can replicate binary encoded nondata marks onto the nanoimprinted disks, wherein the marks can be used as data sector numbers that can extend radially across all the tracks in an annular band, or as servo sector numbers that can extend across all tracks on the disk. FIG. 10 is a section of a disk nanoimprinted by a mold or master disk made by the self-assembling BCP process of the invention wherein the binary encoded nondata marks can be used as track group numbers associated with a chevron servo pattern with fields 150$a$, 150$b$, like that depicted in FIG. 5. Each track group includes multiple data tracks with three groups depicted. There are two sequences of track group numbers. Sequence 2 immediately precedes the chevron servo pattern and has group N identified by binary number 1010010, group N+1 identified by binary number 1010011, and group N+2 identified by binary number 1010101. The binary numbers are formed by combinations of the sets of radial lines and circumferential gaps as described with respect to FIG. 7. As explained with respect to FIG. 5, the measured phase difference from a chevron servo pattern yields only the fractional part of the read head radial position, i.e., the fractional part of one complete radial span of the chevron pattern. Three radial spans are depicted in FIG. 10. Thus the group numbers in sequence 2 identify which of the spans the read head is located on. The group numbers are thus used together with the signal output from the chevron servo pattern to determine the absolute radial position of the read head.

To account for the possibility of the read head being located at a group transition boundary in sequence 2, an optional identical sequence 1 may be used preceding sequence 2. Sequence 1 has a slight radial offset from sequence 2, with the offset being approximately the same as the cross-track width of the read head. Sequences 1 and 2 are both read, but sequence 2 is used to identify the group number unless the readback signal is noisy, indicating the head is at a transition region. Then the output from sequence 1 is used to identify the group number.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method using a block copolymer (BCP) for making a master disk for use in imprinting magnetic recording disks comprising:
    providing a substrate having a center;
    depositing on the substrate a polymeric neutral layer;
    patterning the neutral layer into a pattern of sets of generally radial stripes about said substrate center and circumferential gap regions, each stripe set having the same number of stripes and the stripes in each set being generally equally angularly spaced with a stripe pitch of approximately $nL_0$, where n is an integer equal to or greater than 2 and $L_0$ is the bulk period of the BCP, and the gap regions having the same circumferential gap width greater than 2 $L_0$;
    forming on the patterned neutral layer a BCP having a bulk period $L_0$, the BCP material being guided by the stripes to self-assemble into alternating first and second radial lines of alternating first and second BCP components arranged as lamellae perpendicular to the substrate, the BCP self-assembling in the gap regions as alternating first and second components of the BCP arranged as lamellae parallel to the substrate; and
    removing the second component, leaving sets of generally equally angularly spaced generally radial lines of first component on the substrate.

2. The method of claim 1 wherein the substrate is a mold substrate for making a master disk and further comprising:
    etching the mold substrate, using the first component of the BCP as a mask; and
    removing the first component of the BCP, leaving the mold substrate as a mold having a pattern corresponding to the pattern of the first component of the BCP.

3. The method of claim 1 wherein patterning the neutral layer further comprises forming a pattern of angular sectors of generally radial stripes about said substrate center, the stripe sectors being located between the stripe sets and circumferential gap regions, the stripes in the stripe sectors being generally equally angularly spaced with a stripe pitch of approximately $nL_0$, where n is an integer equal to or greater than 2 and $L_0$ is the bulk period of the BCP.

4. The method of claim 3 wherein the generally radial stripes in the stripe sets and stripe sectors have a generally arcuate shape.

5. The method of claim 3 wherein the polymeric neutral layer is a first polymeric neutral layer and the BCP is a first BCP having a bulk period $L_0$ of $L_{rad}$ and further comprising:
    after removing the second component of the first BCP, depositing on the substrate a second polymeric neutral layer;
    patterning the second neutral layer into a pattern of concentric stripes generally equally spaced and having a stripe pitch of approximately $nL_{circ}$, where n is an integer equal to or greater than 2 and $L_{circ}$ is the bulk period of a second BCP;

forming on the patterned second neutral layer a second BCP having a bulk period $L_{circ}$ greater than $L_{rad}$, the second BCP being guided by the pattern of concentric stripes to self-assemble into alternating concentric rings of first and second components of the second BCP as lamellae perpendicular to the substrate; and removing the second component of the second BCP, leaving the first component of the second BCP as concentric rings on the substrate.

6. The method of claim 5 further comprising etching the substrate, using the first component of the first BCP and the first component of the second BCP as an etch mask, and removing the first component of the first BCP and the first component of the second BCP, leaving an etched substrate having a pattern of sectors of concentric tracks of generally equally angularly spaced generally radial line segments, and sets of radial lines and circumferential gaps between said sectors.

7. The method of claim 5 wherein patterning the second neutral layer further comprises forming a chevron pattern of a first set of parallel bands slanted at an acute angle relative to a radial line from said substrate center and a second set of parallel bands, said second set of bands being non-parallel to and spaced from said first set of bands and slanted at said acute angle relative to a radial line from said substrate center, the second BCP being guided by the pattern of bands to self-assemble into a chevron pattern of alternating first and second components of the second BCP as lamellae perpendicular to the substrate; and wherein removing the second component of the second BCP leaves the first component of the second BCP as a chevron pattern on the substrate.

8. The method of claim 1 wherein patterning the neutral layer comprises removing portions of the neutral layer to expose the substrate.

9. The method of claim 1 wherein patterning the neutral layer comprises chemically altering portions of the neutral layer.

10. The method of claim 1 wherein forming a BCP on the patterned neutral layer comprises depositing a layer of BCP and annealing the deposited BCP to cause phase separation into said first and second components.

11. The method of claim 1 wherein the BCP is a copolymer of polystyrene (PS) and poly(methyl methacrylate) (PMMA).

12. A method using a block copolymer (BCP) for making a master disk for use in imprinting magnetic recording disks comprising:
providing a substrate having a center;
depositing on the substrate a polymeric neutral layer;
patterning the neutral layer into angular sectors of generally radial stripes about said substrate center and binary encoded patterns between the stripe sectors, each binary encoded pattern comprising sets of generally radial stripes about said substrate center and circumferential gaps, each stripe set having the same number of stripes; wherein the stripes in each sector and each set are generally equally angularly spaced with a stripe pitch of approximately $nL_{rad}$, where n is an integer equal to or greater than 2 and $L_{rad}$ is the bulk period of the BCP, and the gaps having the same circumferential gap width greater than 2 $L_{rad}$;
forming on the patterned neutral layer a BCP having a bulk period $L_{rad}$, the BCP material being guided by the stripes in the stripe sectors and stripe sets to self-assemble into alternating first and second radial lines of alternating first and second BCP components arranged as lamellae perpendicular to the substrate, the BCP self-assembling in the gaps as alternating first and second components of the BCP arranged as lamellae parallel to the substrate; and removing the second component, leaving a pattern of angular sectors of generally equally angularly spaced generally radial lines of first component and binary encoded patterns of first component between the line sectors, the binary encoded patterns of first component comprising sets of generally equally angularly spaced generally radial lines of first component and circumferential gaps of first component.

13. The method of claim 12 wherein the substrate is a mold substrate for making a master disk and further comprising:
etching the mold substrate, using the first component of the BCP as a mask; and
removing the first component of the BCP, leaving the mold substrate as a mold having a pattern corresponding to the pattern of the first component of the BCP.

14. The method of claim 12 wherein the generally radial stripes in the stripe sets and stripe sectors have a generally arcuate shape.

15. The method of claim 12 wherein the polymeric neutral layer is a first polymeric neutral layer and the BCP is a first BCP, and further comprising:
after removing the second component of the first BCP, depositing on the substrate a second polymeric neutral layer;
patterning the second neutral layer into a pattern of concentric stripes generally equally spaced and having a stripe pitch of approximately $nL_{circ}$, where n is an integer equal to or greater than 2 and $L_{circ}$ is the bulk period of a second BCP;
forming on the patterned second neutral layer a second BCP having a bulk period $L_{circ}$ greater than $L_{rad}$, the second BCP being guided by the pattern of concentric stripes to self-assemble into alternating concentric rings of first and second components of the second BCP as lamellae perpendicular to the substrate;
removing the second component of the second BCP, leaving the first component of the second BCP as concentric rings on the substrate;
etching the substrate, using the first component of the first BCP and the first component of the second BCP as an etch mask;
removing the first component of the first BCP and the first component of the second BCP, leaving an etched substrate having a pattern of angular sectors of concentric tracks of generally equally angularly spaced generally radial line segments and binary encoded patterns between the angular sectors of concentric tracks, the binary encoded patterns comprising sets of generally equally angularly spaced generally radial lines and circumferential gaps.

16. The method of claim 15 wherein the sets of generally equally angularly spaced generally radial lines left on the substrate are sets of generally equally angularly spaced generally radial line segments, the line segments in the sets being radially aligned with the concentric tracks.

17. The method of claim 15 wherein patterning the second neutral layer further comprises forming a chevron pattern of a first set of parallel bands slanted at an acute angle relative to a radial line from said substrate center and a second set of parallel bands, said second set of bands being non-parallel to and spaced from said first set of bands and slanted at said acute angle relative to a radial line from said substrate center, the second BCP being guided by the pattern of bands to self-assemble into a chevron pattern of alternating first and second components of the second BCP as lamellae perpendicular to the substrate; and wherein removing the second component of the second BCP leaves the first component of the second BCP as a chevron pattern on the substrate.

18. The method of claim 12 wherein patterning the neutral layer comprises removing portions of the neutral layer to expose the substrate.

19. The method of claim 12 wherein patterning the neutral layer comprises chemically altering portions of the neutral layer.

20. The method of claim 12 wherein forming a BCP on the patterned neutral layer comprises depositing a layer of BCP and annealing the deposited BCP to cause phase separation into said first and second components.

21. The method of claim 12 wherein the BCP is a copolymer of polystyrene (PS) and poly(methyl methacrylate) (PMMA).

* * * * *